United States Patent [19]

Wypart et al.

[11] Patent Number: 4,751,118
[45] Date of Patent: Jun. 14, 1988

[54] CLEAR POLYVINYL CHLORIDE ARTICLES AND COMPOSITIONS

[75] Inventors: Roman W. Wypart, Avon Lake; James W. Summers, Bay Village, both of Ohio

[73] Assignee: The B. F. Goodrich Company, Akron, Ohio

[21] Appl. No.: 768,987

[22] Filed: Aug. 26, 1985

[51] Int. Cl.$^4$ .......................... B65D 1/00; C08K 5/10
[52] U.S. Cl. ...................................... 428/35; 264/239; 524/114; 524/308; 524/310; 524/317; 524/377; 524/378; 524/399; 524/400
[58] Field of Search ............... 524/114, 377, 378, 317, 524/310, 308, 399, 400, 567; 428/35; 264/175

[56] References Cited

U.S. PATENT DOCUMENTS

| | | | |
|---|---|---|---|
| 3,558,537 | 1/1971 | Hecker | 523/100 |
| 3,928,267 | 12/1975 | Rhodes et al. | 523/169 |
| 3,980,192 | 9/1976 | Hafner et al. | 215/1 C |
| 4,042,549 | 8/1977 | Ahr | 524/317 |
| 4,178,282 | 12/1979 | Bae | 524/114 |
| 4,348,494 | 9/1982 | Kheidr et al. | 524/114 |
| 4,368,139 | 1/1983 | Pollock et al. | 524/114 |

OTHER PUBLICATIONS

Hoang et al. "The Role of Polyols as Secondary Stabilizers for Poly(Vinyl Chlorides)" vol. 12, *Polymer Degradation and Stability* (1985) pp. 29-41.

*Primary Examiner*—Henry F. Epstein
*Assistant Examiner*—James J. Seidleck
*Attorney, Agent, or Firm*—Joe A. Powell

[57] ABSTRACT

Polyvinyl chloride articles such as bottles and films are provided which have a high degree of clarity, low haze, low blush, excellent color stability and which do not impart taste and odor to the contents of the article. A novel composition is used to form the articles. Said composition comprises at least one ingredient selected from the group having the formula:

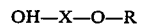

OH—X—O—R and

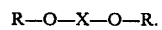

R—O—X—O—R.

X in the above formulas is a straight chain, branched or cyclic radical having from 2 to about 20 oxygen atoms, preferably from 2 to 10 and more preferably from 2 to 6. At least one of said oxygen atoms must form an ether linkage and the remainder may form ether, epoxy or hydroxy bonds or mixtures thereof. X also has from about 4 to about 60 carbon atoms, preferably 6 to 30, more preferably 6 to 20. R is a straight chain radical having from about 5 to about 40 carbon atoms, preferably 12 to 20.

28 Claims, No Drawings

CLEAR POLYVINYL CHLORIDE ARTICLES AND COMPOSITIONS

BACKGROUND OF THE INVENTION

Polyvinyl chloride (PVC) has enjoyed a great deal of commercial success as a material which can form useful articles. The ease at which it can be molded, extruded, calendered or formed and its low cost has contributed to this success. However, these vinyl chloride polymers are particularly susceptible to degradation by heat because of the high temperatures at which these polymers must be processed to make useful articles. To protect these vinyl chloride polymers from heat degradation, it is customary to add materials known as stabilizers.

PVC by itself is not heat stable. It would be impossible to process it in industrial machines without using stabilizers. During processing at high temperatures (about 200° C.), this instability leads to the loss of hydrochloric acid and the formation of color. These two phenomena can be explained by the following reactions:

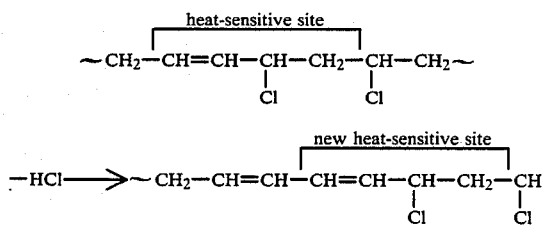

hydrochloric acid is released from a heat sensitive site which is at the allylic chlorine. As hydrochloric acid is released, a double bond and a new active site is formed. Degradation continues, step by step releasing increasing amounts of hydrochloric acid and creating long sequences of colored interacting double bonds. This dehydrochlorination reaction is catalyzed by the presence of bases, acids and certain salts.

Hydrochloric acid and zinc chloride are particularly bad and their presence should be limited.

The heat stabilizers most commonly used to prevent this degradation are metallic salts, such as organic salts of tin, calcium and zinc.

Many times colorants are added to polyvinyl chloride to make colored articles, but in certain applications it is desirable to have an article which is transparent. Articles such as bottles, packages and films for certain markets demand a high degree of clarity. To achieve a high clarity it is customary to mix a tin stabilizer with the vinyl polymer. Unfortunately, tin stabilizers are known to impart an undesirable taste and odor to the contents of a tin stabilized PVC article. For example, if a PVC water bottle was stabilized, then within a very short time the water would have an undesirable smell and taste.

For products where taste and odor are important, it is customary to use a calcium/zinc stabilizer system. The calcium/zinc stabilizer works by neutralizing the hydrochloric acid that is formed and by stopping the propagation reaction. The zinc compound reacts with HCl to form zinc chloride. Zinc chloride is also a catalyst for degradation. This is why the calcium stabilizer is used. The calcium reacts with the zinc chloride to form calcium chloride which has no catalytic effect on degradation. The zinc salts limit the early development of color by reacting with the hydrochloric acid but cause sudden decomposition. The calcium salts delay decompsition but allow early color to develop. These opposing affect must be compromised. The calcium/zinc stabilizer system does not impart objectionable taste and odor. However, there are other problems with the calcium/zinc stabilizer system, one of which is the clarity of the article, such as a bottle, is not as clear as with the tin stabilizer. Also, the prior known calcium/zinc stabilizer system develops "blush" which is a cloudiness in the bottle wall due to exposure to alcohol and water.

The calcium/zinc stabilizer system has been approved by the U.S. Food and Drug Administration for use in contact with food and beverages. It is customary to use other materials known as co-stabilizers with the calcium/zinc stabilizer system. The most widely used calcium/zinc stabilization systems for PVC are combinations of at least four ingredients: zinc soap, calcium soap, epoxidized fatty ester, and non-toxic organic phosphite ester. The above stabilization system gives short color stability time with good yellowness or initial color. It is then necessary to use additional co-stabilizers to increase heat stability while maintaining low yellowness and good processability of the bottle compositions. Commonly, alcohols have been added which improve thermal stability but they cause "blush". The problem of "blush" is of particular importance when the bottle contains an alcohol solution such as is the case with mouthwash bottles.

The art of PVC compounding is extremely complex in that many ingredients interact with each other. This complexity means that levels of ingredients and types of ingredients must be varied to give a product which is useful for a given application. It is seldom as simple as adding one ingredient which improves a particular property but does not effect other important properties.

It would be very desirable to have a calcium/zinc stabilized PVC article, such as a bottle, which would have high clarity and low blush and be substantially or completely free of tin stabilizers so as not to impart taste and odor to the contents of the article.

It would also be desirable to improve the calcium/zinc stabilization system so as to make the system give more heat degradation resistance.

SUMMARY OF THE INVENTION

A PVC article having the following characteristics:

(a) high degree of clarity as defined by having a percent light transmission greater than that described by the following formula:

% Light Transmission=100−460 (inch thickness) as measured according to ASTM D-1746;

(b) percent haze measured according to ASTM D1003-61 and having a value less than that described by the following formula:

% Haze=184.6 (inch thickness);

(c) blush less than 30% at 0.065 inch thickness after exposure for 48 hours at 50° C. in a 50/50 ethanol water solution;

(d) color stability time greater than 16 minutes to turn black when aged at 200° C., according to ASTM D-1925;

(e) said PVC article does not impart an objectionable taste nor odor to other materials in contact with said PVC article.

A PVC article as characterized above may be produced from a novel PVC composition having the properties shown in (a) through (c) above and in addition having the following properties:

(f) yellowness index less than 13% at 0.065 inch thickness as measured according to ASTM D-1925 on an unpigmented compound;

(g) color stability according to ASTM D-1925 of a time greater than about 20 minutes to turn black when aged at 200° C.;

(h) said compositions are substantially free of tin stabilizer, preferably no tin stabilizer is present.

The composition comprises at least one compound selected from the group consisting of compounds having the formula:

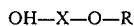

OH—X—O—R and

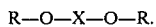

R—O—X—O—R.

X in the above formulas is a straight chain, branched or cyclic radical having from 2 to about 20 oxygen atoms, preferably from 2 to 10 and more preferably from 2 to 6. At least one of said oxygen atoms must form an ether linkage and the remainder may form ether, epoxy or hydroxy bonds or mixtures thereof. X also has from about 4 to about 60 carbon atoms, preferably 6 to 30, more preferably 6 to 20. R is a straight chain radical having from about 5 to about 40 carbon atoms, preferably 12 to 20.

DETAILED DESCRIPTION

The novel high clarity PVC articles of this invention include articles such as bottles, jars, packages, films and the like. The articles are intended to contain products which products may be liquid or solid. A particular useful article of this invention is PVC bottles, especially those which must be clear and which do not impart taste or odor to the contents of the bottle. Products which are most sensitive to taste or odor, of course, are those that are intended for human consumption such as mouthwash, water, beverages, and the like. The article referred to in this specification may also be a package which contains solid products. Sometimes only a portion of the package may be clear PVC and the remainder other material such as paper, metal or other material. An example of this would be a vacuum formed blister package, where the top would be clear PVC and the bottom would be cardboard.

This invention will be described in terms of a clear PVC bottle for illustrating an embodiment, but those skilled in the art could easily apply the invention to other articles.

The novel high clarity bottles are made from a polymeric composition comprised of a vinyl polymer and other essential compounding ingredients.

PVC, vinyl polymer, or vinyl polymer material, as used herein, refers to homopolymers and copolymers of vinyl halides and vinylidene halides, such as vinyl chloride, vinyl bromide, vinylidene chloride, etc. The vinyl halides and vinylidene halides may be copolymerized with each other or each with one or more polymerizable olefinic monomers having at least one terminal $CH_2=C<$ grouping. As examples of such olefinic monomers there may be mentioned the $\alpha,\beta$-olefinically unsaturated carboxylic acids, such as acrylic acid, methacrylic acid, ethacrylic acid, $\alpha$-cyanoacrylic acid, and the like; esters of acrylic acid, such as methyl acrylate, ethyl acrylate, butyl acrylate, octyl acrylate, cyanoethyl acrylate, and the like; esters of methacrylic acid, such as methyl methacrylate, butyl methacrylate, and the like; nitriles, such as acrylonitrile, methacrylonitrile, and the like; acrylamides, such as methyl acrylamide, N-methylol acrylamide, N-butyoxy methyacrylamide, and the like; vinyl ethers, such as ethyl vinyl ether, chloroethyl vinyl ether, an the like; the vinyl ketones; styrene and styrene derivatives, such as -methyl styrene, vinyl toluene, chorostyrene, and the like; vinyl naphthalene, allyl and vinyl chloroacetate, vinyl acetate, vinyl pyridine, methyl vinyl ketone; the diolefins, including butadiene, isoprene, chloroprene, and the like; and other polymerizable olefinic monomers of the types known to those skilled in the art.

The present invention is particularly applicable to homopolymers and copolymers made by the polymerization of vinyl chloride or vinylidene chloride alone or in admixture with one or more polymerizable olefinic monomers copolymerizable therewith in amounts up to about 20% by weight, based on the weight of the monomer mixtures. Copolymers have a tendency to decrease the clarity of the article and therefor their amount should be minimized. The most preferred vinyl polymer, or resin, is polyvinyl chloride (PVC) homopolymer produced by the mass polymerization process and the invention, for simplicity and convenience, will be described in connection therewith, it being understood that this is merely intended in an illustrative sense and not limitative. The mass polymerization process produces a resin which is free of the pericellular membrane that is present in resin produced by the suspension process. Articles of this invention may be made from suspension resins or mass resins.

The high clarity bottles of this invention have, in addition to the vinyl polymer described above, an essential stabilizer system. A common stabilizer system that is used in prior clear PVC bottles is a tin stabilizer system. Tin stabilizers cause an objectionable taste and odor to products such as mouthwash, bottled water, beverages and the like. Since the bottles of this invention do not impart taste and odor to the bottle contents, tin stabilizers should be substantially avoided and preferably completely avoided. The level of tin stabilizer should be less than about 0.1 part by weight per 100 parts by weight of vinyl polymer.

To achieve the high degree of stability necessary a calcium/zinc stabilizer system may be used in the polymeric composition that is used to produce the bottles of this invention. At least one calcium soap and one zinc soap may be each used at a level of from about 0.005 to about 1.0, preferably from about 0.03 to about 0.30 part by weight per 100 parts by weight of vinyl polymer. It is preferred that the level of zinc soap be greater than the level of calcium soap. The calcium soap level may be very low or even not present at all in this invention. In the most preferred embodiment, the zinc soap is about twice the level of the calcium soap.

Examples of suitable calcium soaps are calcium stearate, calcium laurate, calcium oleate, calcium palmitate, calcium octoanate, and calcium benzoate. Calcium stearate is the preferred calcium soap. Examples of suitable zinc soaps are zinc stearate, zinc laurate, zinc palmitate, zinc 2-ethyl hexanate, zinc octoanate, zinc oleate, and zinc benzoate. Zinc stearate is the preferred zinc soap.

In addition to the calcium/zinc stabilizer system, the polymeric composition contains co-stabilizers. A stabilizer which also functions as a lubricant in this invention is at least one compound selected from the group consisting of compounds having the formula:

OH—X—O—R and

R—O—X—O—R.

X in the above formulas is a straight chain, branched or cyclic radical having from 2 to about 20 oxygen atoms, preferably from 2 to 10 and more preferably from 2 to 6. At least one of said oxygen atoms must form an ether linkage and the remainder may form ether, epoxy or hydroxy bonds or mixtures thereof. X also has from about 4 to about 60 carbon atoms, preferably 6 to 30, more preferably 6 to 20. R is a straight chain radical having from about 5 to about 40 carbon atoms, preferably 12 to 20.

Compounds that conform to the above formulas may be prepared by reacting glycerols, such as triglycerol or hexaglycerol, with a fatty acid such as stearic acid. The term fatty acid wherever used herein is intended to mean that one purified fatty acid may be used or a mixture of fatty acids may be used. Glycerols may be reacted with hydroxy fatty acids, such as 12 hydroxy stearic acid to form the co-stabilizers of this invention. Glycerols may also be reacted with long chain alcohols, such as dodecyl alcohol. These co-stabilizers may also be prepared by using glycols such as ethylene glycol or propylene glycol and reacting these glycols with a fatty acid, hydroxy fatty acid, or long chain alcohol.

Co-stabilizer compounds of this invention which conform to the above formulas may also be produced from mixed glycols which could be synthesized by etherification of glycerin with propylene glycol or ethylene glycol or other glycols. The synthesized mixed glycols could then be reacted with a fatty acid, hydroxy fatty acid or long chain alcohol to produce the novel co-stabilizers of this invention. Also multi-hydroxy alcohols could be used in the presence of glycerin during the synthesis of glycerol. Suitable multi-hydroxy alcohols include trimethylol propane, ditrimethylol propane, pentaerythritol and dipentaerythritol.

Multi-hydroxy alcohols such as ditrimethylolpropane and dipentaerythritol may be reacted directly with a fatty acid, hydroxy fatty acid or long chain alcohol to produce novel stabilizers of this invention.

In the formulas above, R is a straight chain radical having from about 5 to about 40 carbon atoms. The long straight chain of R is important in creating high clarity products because of its miscibility with PVC. R may be substituted with, for example, hydroxy or chlorine. The substitution should be kept to a minimum so as not to affect the miscibility with PVC and therefore the clarity of the product. R forms a linkage with X which may be ester

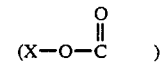

or ether (X—O—C———). The ester linkage is formed when a fatty acid is used in making the co-stabilizer and the ether linkage is the result of using a long chain alcohol.

The novel co-stabilizers of this invention are very seldom pure compounds but are a mixture. This mixture occurs because of the impure nature of the reactants and because of the way the reaction progresses. For example, triglycerol monostearate may contain some distearate and tristearate. The glycerol part of the compound may also be made up of different glycerols which may be straight chain, branched or cyclic.

The hydroxy end group in the above formula OH—X—O—R could be replaced by an —O—R group thus resulting in the above shown formula R—O—X—O—R. This formula represents materials such as hexaglycerol distearate.

Preferably the co-stabilizers of this invention are oligo-glycerols having the formula:

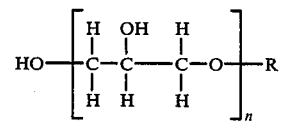

wherein n=2 to 20, preferably 2 to 10 and more preferably 2 to 6 and R is as defined above. The oligo-glycerol may be straight chain, branched or cyclic. Preferred oligo-glycerols are esters of oligo-glycerol and a fatty acid wherein the ratio of glycerol units to fatty acid units is greater than 1:1 preferably greater than 2:1. Readily commercial available esters include triglycerol monostearate, hexaglycerol monostearate and hexaglycerol distearate. It was very unexpected to find that esters having a ratio of glycerol units to fatty acid units greater than 1:1 would act as co-stabilizers to form the high clearity bottles while esters with a ratio of 1:1 such as glycerol monostearate would not work satisfactorily.

The co-stabilizers may be oligo-propylene glycols having the formula:

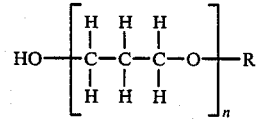

wherein n and R are as defined above. Examples of oligo-propylene glycol co-stabilizers include tripropylene glycol monostearate, hexapropylene glycol monostearate and tripropylene glycol monolaurate.

The co-stabilizers may also be oligo-ethylene glycols having the formula:

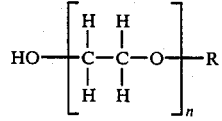

wherein n and R are as defined above. Examples of oligo-ethylene glycol co-stabilizers include triethylene glycol monostearate, hexaethylene glycol monostearate and triethylene glycol monolaurate.

The combined level of the novel co-stabilizers used is from about 0.2 to about 3.0 parts by weight per 100 parts by weight of vinyl polymer. Preferably the amount used is from about 0.4 to about 1.5 parts by weight per 100 parts by weight of vinyl polymer. A mixture of more than one of these co-stabilizers may be used.

With the novel co-stabilizers of this invention, the calcium soap may be reduced to a very low level or taken out completely, thus giving improved early color retention. This feature is very surprising and leads to the suspicion that the co-stabilizers of this invention form complexes with zinc chloride, thus replacing the function of the calcium soap.

Other co-stabilizers which are used, in addition to the novel co-stabilizers described above, are the co-stabilzers which are known to those skilled in the art, such as phosphite stabilizers, polymeric phosphites, beta-diketones, and the like. Epoxidized soybean oil also may serve a dual role as a co-stabilizer and a plasticizer. A particularly desirable lubricant is a polyglycerol of di and tri oleates which works very well in combination with the ester disclosed above.

The composition also may contain other ingredients such as impact modifiers and lubricants which assist in the processing of the polymeric composition into the final article. Small amounts of blue pigments may be mixed into the composition to slightly tint the article while still keeping the clarity.

The ingredients of the composition are thoroughly mixed together to form the compound before it is shaped into the desired article. Mixing may be accomplished by any of the customary methods known to those skilled in the art such as with a Banbury, Henshel, mills or other mixers.

The composition may be formed into useful high clarity articles by different methods depending on the desired end product. Standard techniques may be used to form the articles. Suitable methods to produce PVC bottles include extrusion-blow molding, injection-blow molding, and stretch-blow molding. Bottles may be formed by the extrusion-stretch process disclosed in U.S. Pat. No. 3,980,192, incorporated herein by reference. Films may be made by calendering. PVC bottles would normally have a wall thickness of from about 0.005 inch to about 0.100 inch. Films normally have a thickness of from about 0.001 inch to about 0.100 inch.

Articles made from the above described compositions have unusual and unexpected properties. One such property is clarity. Clarity can be measured by the percent of light transmission through an article. Percent light transmission is normally measured according to ASTM D-1746 on a sample which is 0.065 inch thick. The higher the percentage of transmission the more clear the sample. Articles, such as bottles, of this invention which have a thickness of 0.065 inch will have a percent light transmission greater than about 70%. As the thickness varies, so does the light transmission. For articles of this invention, the percent light transmission will be greater than that described by the formula: % Light Transmission=100−460 (thickness in inches). Preferably the percent light transmission will be greater than that described by the formula:

% light transmission=100−400 (inch thickness).

Another important property that the articles of this invention must have is a low haze. Haze is expressed as a percentage and is measured according to ASTM D1003-61 on a 0.065 inch thick sample. For a 0.065 inch thick sample, articles of this invention will have a haze less than about 12%. As the thickness increases, the percent haze will increase. For articles of this invention, percent haze will be less than that expressed by the formula:

% haze=184.6 (thickness in inches).

Preferably the percent haze will be less than that expressed by the formula:

% haze=100 (inch thickness).

Articles of this invention also must have good color stability. Color stability may be determined by measuring the yellowness index according to ASTM D-1925 at different time internals after subjecting to high temperatures. The articles of this invention must have a time greater than about 16 minutes at 200° C. to turn black. Preferably the time to turn black is greater than about 21 minutes.

For articles which are designed to contain alcohol solutions which is the case with mouthwash bottles, another feature the bottles must have is a low blush. Blush is defined as the percent haze after aging for 48 hours at 50° C. in a 50/50 blend of ethanol and water. If a bottle is sensitive to the alcohol solution it will start clear but in a short time turn cloudy. It is believed the alcohol hydrolizes certain ingredients in the composition as one cause of blush. Physical absorption of alcohol or water is another cause of blush. Compositions to make the bottles of this invention have a percent blush of less than 30% when measured on a 0.065 inch sample after 48 hours at 50° C. in a 50/50 ethanol-water solution.

The articles of this invention also must not impart taste and odor to the contents of the article. This can best be accomplished by using ingredients which do not form soluble compounds that have objectionable taste and odor. Tin stabilizers should be held to a minimum or preferably avoided altogether. Tin stabilizers form dioctyl tin dichloride during processing of the article, which is soluble in water and causes taste and odor.

The novel compositions used to produce the articles of this invention have, in addition to the properties of clarity, haze, blush and low taste/odor described for the article above, other measurable necessary properties.

One such property which the compositions must have is they must have a low yellowness index. PVC compositions must be processed at temperatures of about 200° C. At these high temperatures, PVC compositions have a tendency to become more yellow the longer they are maintained at the elevated temperatures. As time at the high temperature is increased, the yellow color turns to an amber, then dark amber and finally to a black color. A composition should give a low yellowness index of less than about 13 on an unpigmented sample and a time to turn black greater than about 20 minutes as measured according to ASTM D-1925 on a 0.065 inch thick sample. During processing the compositions into useful articles about 4 minutes of stability time will normally be used. This is the reason why the compositions need greater than about 20 minutes of time before turning black whereas the finished article will have greater than about 16 minutes of stability before turning black.

The compositions must also have less than about 0.1 part per 100 parts vinyl polymer of tin stabilizer, preferably the compositions are free of tin stabilizer.

The following examples are presented to illustrate the present invention more fully.

EXAMPLES 1–24

In these examples, 24 different PVC compositions are evaluated for their suitability for producing high clarity articles such as PVC bottles. The compositions were all mixed using an intensive powder mixer, Banbury and two roll mill mixer following normal mixing procedures which are well known to those skilled in the art. The mixing procedure was as follows: Powder mixing to 200° F., Banbury mixing to 300° F., and two roll mill mixing at 310° F. mill roll temperature for 2 minutes.

The recipes for the compositions evaluated are as shown in Table I. All amounts of ingredients are shown in weight parts based on 100 weight parts of vinyl chloride polymer.

TABLE I

| Ingredient | 1 | 2 | 3 | 4 | 5 | 6 | 7 | 8 | 9 | 10 | 11 | 12 |
|---|---|---|---|---|---|---|---|---|---|---|---|---|
| PVC homopolymer | 100.00 | 100.00 | 100.00 | 100.00 | 100.00 | 100.00 | 100.00 | 100.00 | 100.00 | 100.00 | 100.00 | 100.00 |
| Impact modifier | 10.00 | 10.00 | 10.00 | 10.00 | 10.00 | 10.00 | 10.00 | 10.00 | 10.00 | 10.00 | 10.00 | 10.00 |
| Lubricants and Processing Aids | 2.40 | 2.40 | 2.40 | 2.40 | 2.40 | 2.40 | 1.05 | 1.05 | 1.05 | 1.05 | 1.05 | 0.50 |
| Tin Stabilizer | 2.00 | — | — | — | — | — | — | — | — | — | — | — |
| Calcium Stearate | — | 0.25 | 0.25 | 0.25 | 0.25 | 0.25 | 0.25 | 0.25 | 0.25 | 0.25 | 0.25 | 0.10 |
| Zinc Stearate | — | 0.20 | 0.20 | 0.20 | 0.20 | 0.20 | 0.20 | 0.20 | 0.20 | 0.20 | 0.20 | 0.20 |
| β-diketone mixture co-stabilizer | — | 0.25 | — | — | — | 0.25 | 0.25 | 0.25 | 0.25 | 0.25 | 0.25 | 0.25 |
| Epoxidized Soybean Oil | — | 5.00 | — | 5.00 | 5.00 | 5.00 | 5.00 | 5.00 | 5.00 | 5.00 | 5.00 | 5.00 |
| Phosphite co-stabilizer | — | — | — | — | 1.00 | 1.00 | 1.00 | 1.00 | — | 1.00 | 1.00 | 1.00 |
| Glycerol monostearate | — | — | — | — | — | — | — | — | — | — | — | 1.00 |
| Triglycerol monostearate | — | — | — | — | — | — | — | 1.00 | 1.00 | — | — | — |
| Polyglycerol of di and tri oleates | — | — | — | — | — | — | — | — | — | 1.00 | — | — |
| Hexaglycerol distearate | — | — | — | — | — | — | — | — | — | — | 1.00 | — |
| Triethylene glycol | — | — | — | — | — | — | 1.00 | — | — | — | — | — |
| Polymeric phosphite | — | — | — | — | — | — | — | — | — | — | — | — |
| TEST | | | | | | | | | | | | |
| % Hunter Haze | 15.32 | 9.28 | 11.05 | 8.49 | 12.52 | 11.63 | 10.83 | 14.49 | 15.00 | 21.73 | 20.64 | 8.80 |
| % Light Transmission | 66.70 | 72.25 | 62.95 | 67.20 | 64.31 | 68.73 | 69.98 | 64.15 | 62.44 | 55.28 | 54.24 | 74.34 |
| % Yellowness Index | 9.01 | 14.08 | 49.63 | 42.29 | 32.85 | 13.11 | 15.00 | 19.58 | 25.40 | 25.33 | 26.76 | 5.37 |
| % Blush | 13.32 | 13.45 | 11.65 | 11.70 | 18.08 | 18.04 | 94.67 | 34.58 | 39.93 | 31.43 | 33.31 | 15.66 |
| Oven Color Stability to black (min.) @ 200° C. of composition | 30 | 17 | 5 | 19 | 15 | 15 | 40 | 35 | 45 | 26 | 37 | 10 |
| Calculated Article Stability (min.) @ 200°C. | 26 | 13 | 1 | 15 | 11 | 11 | 36 | 31 | 41 | 22 | 33 | 6 |

| Ingredient | 13 | 14 | 15 | 16 | 17 | 18 | 19 | 20 | 21 | 22 | 23 | 24 |
|---|---|---|---|---|---|---|---|---|---|---|---|---|
| PVC homopolymer | 100.00 | 100.00 | 100.00 | 100.00 | 100.00 | 100.00 | 100.00 | 100.00 | 100.00 | 100.00 | 100.00 | 100.00 |
| Impact modifier | 10.00 | 10.00 | 10.00 | 10.00 | 10.00 | 10.00 | 10.00 | 10.00 | 10.00 | 10.00 | 10.00 | 10.00 |
| Lubricants and Processing Aids | 0.50 | 0.50 | 0.50 | 0.50 | 0.50 | 0.50 | 0.50 | 2.00 | 2.00 | 2.00 | 2.00 | 2.00 |
| Tin Stabilizer | — | — | — | — | — | — | — | — | — | — | — | — |
| Calcium Stearate | 0.10 | 0.10 | 0.10 | — | 0.10 | 0.10 | 0.10 | 0.10 | 0.10 | 0.10 | 0.10 | 0.10 |
| Zinc Stearate | 0.20 | 0.20 | 0.20 | 0.20 | 0.20 | 0.20 | 0.20 | 0.20 | 0.20 | 0.20 | 0.20 | 0.20 |
| β-diketone mixture co-stabilizer | 0.25 | 0.25 | 0.25 | 0.25 | 0.25 | 0.25 | 0.25 | 0.20 | 0.20 | 0.20 | 0.20 | 0.20 |
| Epoxidized Soybean Oil | 5.00 | 5.00 | 5.00 | 5.00 | 5.00 | 5.00 | 5.00 | 5.00 | 5.00 | 5.00 | 5.00 | 5.00 |
| Phosphite co-stabilizer | 1.00 | 1.00 | 1.00 | 1.00 | 1.00 | 1.00 | 1.00 | — | — | — | 0.80 | — |
| Glycerol monostearate | 1.00 | 1.00 | — | — | — | — | — | — | — | — | — | — |
| Triglycerol monostearate | — | 1.00 | 1.00 | 0.75 | — | — | 0.25 | 0.90 | 1.00 | — | 1.00 | — |
| Polyglycerol of di and tri oleates | — | — | — | 0.25 | 1.00 | — | — | 0.20 | — | — | — | — |
| Hexaglycerol distearate | — | — | — | — | — | 1.00 | 0.75 | — | — | — | — | 1.00 |
| Triethylene glycol | 1.00 | — | — | — | — | — | — | — | — | 1.00 | — | — |
| Polymeric phosphite | — | — | — | — | — | — | — | 0.80 | 0.80 | 0.80 | — | 0.80 |
| TEST | | | | | | | | | | | | |
| % Hunter Haze | 6.24 | 14.30 | 8.97 | 10.65 | 15.30 | 10.40 | 12.35 | 5.17 | 4.61 | 2.23 | 3.96 | 7.12 |
| % Light Transmission | 78.79 | 64.58 | 73.50 | 71.16 | 64.41 | 69.32 | 62.02 | 77.92 | 79.39 | 86.42 | 80.97 | 74.72 |
| % Yellowness Index | 4.38 | 14.50 | 8.15 | 8.68 | 12.68 | 13.73 | 14.41 | 9.57 | 8.00 | 4.15 | 9.17 | 15.13 |
| % Blush | 92.92 | 49.09 | 32.56 | 31.67 | 24.13 | 29.78 | 30.55 | 25.98 | 23.31 | 76.61 | 24.19 | 29.25 |
| Oven Color Stability to black (min.) @ 200° C. of composition | 15 | 22 | 23 | 20 | 16 | 30 | 29 | 28 | 28 | 17 | 20 | 40 |
| Calculated Article Stability | 11 | 18 | 19 | 16 | 12 | 26 | 25 | 24 | 24 | 13 | 16 | 36 |

TABLE I-continued ity (min.) @ 200° C.

DISCUSSION OF DATA PRESENTED IN EXAMPLES 1-24

Example 1 shows a control compound using a tin stabilizer. Although the color stability time (30 min.) is good, the haze is too high and the light transmission is slightly low. Also, since the composition has a tin stabilizer, the composition would impart taste and odor to the contents of any bottle made from the compsition.

Example 2 represents a prior known good quality PVC composition for bottles based on a calcium/zinc stabilizer system. As compared to the tin stabilizer system of Example 1, haze is lowered but color stability time is greatly reduced.

Examples 3 and 4 compare the effects of epoxidized soybean oil. Example 4 shows greatly improved color stability time when compared to Example 3 (19 vs. 5). Also haze is lowered, light transmission is increased and yellowness is reduced by adding the epoxidized soybean oil.

Example 5 is the same as Example 4 except that a phosphite was added in Example 5. Early color was improved (yellowness) but color stability decreased.

In Example 6, a mixture of $\beta$-diketones was added which improved the yellowness while keeping the color stability constant.

Example 7 shows that when part of the lubricant system is replaced by triethylene glycol, the color stability is greatly improved but the blush is made very bad. It appears that the glycol is very bad for blush because when in contact with alcohol and water it absorbs the alcohol and water and causes the composition to turn cloudy.

Example 8 shows that when the novel ingredient triglycerol monostearate was used to replace part of the lubricant system that blush was improved over Example 7 where triethylene glycol was used and stability was greatly improved over Example 6.

In Example 9, the phosphite was removed. The long term color stability was improved but the yellowness was higher.

Example 10 is the same as Example 9 except triglycerol monostearate was replaced by a polyglycerol of di and tri oleates as the lubricant and the phosphite was put back in. Haze was higher, light transmission was lower and color stability was much less.

In Example 11, hexaglycerol distearate was used as lubricant in place of the polyglycerol of Example 10. The result was improved color stability.

In Example 12, the level of the calcium stearate was reduced to 0.1 part. Haze, light transmission, yellowness and blush were all improved. However, calcium stearate functions as a stabilizer and therefore the color stability of 10 minutes is too low for satisfactory results.

To improve the stability of Example 12, triethylene glycol was added in Example 13. Stability was improved but the blush was dramatically made worse (higher).

Example 14 shows that by adding triglycerol monostearate, stability was further improved and blush was improved but yellowness, haze and light transmission were lowered.

Example 15 shows that when the glycerol monostearate was removed from Example 14 the haze, light transmission, yellowness and blush were all improved.

In Example 16, part of the triglycerol monostearate was replaced with a polyglycerol of di and tri oleates. No significant affect was noted although the results were pointing to less desirable results.

When Example 17 is compared to Example 15, it can be seen that triglycerol monostearate is an improvement over a polyglycerol of di and tri oleates.

Example 18 shows that hexaglycerol distearate is also more effective than a polyglycerol of Exaple 17 for stability, haze, and light transmission.

Example 19 shows a blend of triglycerol monostearate and hexaglycerol distearate gives better stability than the polyglycerol of di and tri oleates.

Example 20 increased the processing aid, reduced the $\beta$-diketones and added a polymeric phosphite for the phosphite of the previous Examples. The results meet all the requirements of an excellent bottle compound.

Example 21 removed the small amount of the polyglycerol in Example 20 and added a small amount of triglycerol monostearate. Once again an excellent formulation was obtained.

In Example 22, triglycerol monostearate was replaced with triethylene glycol. The stability and blush were less desirable.

Example 23, when compared to Example 21, shows that the polymeric phosphite of Example 21 gives improved stability over the phosphite in Example 23.

Example 24 shows that hexaglycerol distearate gives improved stability over triglycerol monostearate but gives also results in higher yellowness and lower light transmission.

Of the 24 different compositions shown by the Examples, only those of Examples 20, 21, and 23 give the combination of results that are most suited for a PVC bottle composition.

Compounding PVC compositions is a very complex art and many ingredients interact with each other to give different results depending on the levels and nature of the remainder of the composition.

The compositions of Examples 20, 21, and 23 give compositions which when processed into articles such as bottles, containers, and films will give articles which have been heretofor unknown in the art. The articles have a high degree of clarity, will no be excessively cloudy (blush) when exposed to alcohol and have excellent initial color (yellowness) and excellent color stability.

EXAMPLE 25

This Example is presented to show another critical feature of the bottles of this invention. That feature being an absence of an odor or taste imparted to the contents of the bottle.

Bottles were made from the compositions of Examples 1 and 21. Distilled water was placed in each bottle and aged for 12 weeks at 50° C. The water was taste tested and odor tested by a panel of six people after 3 days. The water in the bottle made from the composition of Example 1 had a very noticeable foul odor. The panelists could not distinguish the water in the bottle made from the composition of Example 21 from fresh distilled water in either taste nor odor. Aging continued for 12 weeks and the water in the bottle made from the composition of Example 21 could not be distinguished from fresh distilled water.

This Example shows that the objectionable odor and taste problems associated with the tin stabilizer system is not present in the calcium/zinc stabilizer used in this invention.

Articles of this invention have the best of both properties, they have the clarity and stability of a tin stabilized product but the taste and odor properties of the calcium/zinc stabilized products.

The articles of this invention are useful for containing beverages or other products as well as films where high clarity is desired.

We claim:

1. A polyvinyl chloride article consisting essentially of a PVC compostion wherein said PVC composition comprises:
   (A) 100 parts by weight of PVC;
   (B) stabilizer system comprising (i) from about 0.005 part by weight to about 1.0 part by weight of at least one zinc soap and (ii) from 0 to about 1.0 part by weight of at least one calcium soap;
   (C) co-stabilizer system comprising from about 0.2 part by weight to about 1.5 parts by weight of at least one co-stabilizer compound selected from the group consisting of compounds having the formula:

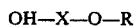
   OH—X—O—R and

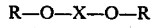
   R—O—X—O—R wherein X is a straight chain, branched or cyclic radical having:
   (a) from 2 to about 20 oxygen atoms, wherein at least one of said oxygen atoms forms an ether linkage and the remainder forms bonds selected from the group consisting of ether, epoxy and hydroxy;
   (b) from about 4 to about 60 carbon atoms; wherein R is a straight chain radical having from about 5 to about 40 carbon atoms;
   (D) at least one lubricant;
   (E) at least one impact modifier;
   wherein said polyvinyl chloride article is characterized by having the following properties:
   (I) high degree of clarity as defined by having a percent light transmission greater than that described by the following formula:

% Light Transmission=100–460 (inch thickness) as measured according to ASTM D-1746;

(II) percent haze measured according to ASTM D-1003-61 and having a value less than that described by the following formula:

% Haze=184.6 (inch thickness);

(III) bluch less than 30% at 0.065 inch thickness after exposure for 48 hours at 50° C. in a 50/50 ethanol water solution;
   (IV) color stability time greater than 16 minutes to turn black when aged at 200° C., according to ASTM D-1925;
   (V) said PVC article does not impart an objectionable taste nor odor to other materials in contact with said PVC article;
   (VI) yellowness index less than about 13% at 0.065 inch thickness as measured according to ASTM D-1925 on an unpigmented compound.

2. A polyvinyl chloride article of claim 1 wherein said co-stabilizer in (C) is selected from the group consisting of oligo-glycerol, oligo-propylene glycol and olig-ethylene glycol; wherein said oligo-glycerol has the formula:

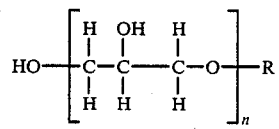

said glycerol may be straight chain, branched or cyclic; wherein n=2 to 20 and R is a straight chain radical having from about 5 to abut 40 carbon atoms; said oligo-proplene glycol has the formula:

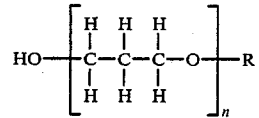

wherein n and R are as defined above; said oligo-ethylene glycol has the formula:

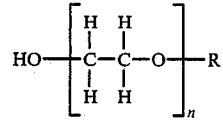

wherein n and R are as defined above.

3. An article of claim 2 wherein said oligo-glycerol is an ester of oligo-glycerol and a fatty acid wherein the molar ratio of glycerol to fatty acid is greater than 1:1.

4. An article of claim 3 wherein said molar ratio is greater than 2:1.

5. An article of claim 4 wherein said ester of oligo-glycerol and a fatty acid is selected from the group consisting of triglycerol monsterate, hexaglycerol monsterate of triglycerol monostearate, hexaglycerol monostearate and hexaglycerol distearate.

6. An article of claim 5 wherein the level of said ester is from about 0.4 part to about 1.5 parts by weight of PVC.

7. An article of claim 6 wherein the PVC is a PVC homopolymer.

8. An article of claim 7 wherein the levels of each of the zinc soap and calcium soap is from about 0.03 part by weight to about 0.30 part by weight per 100 parts by weight of PVC.

9. An article of claim 1 wherein in addition to the co-stabilizer of (C) there is present at least two additional co-stabilizers selected from the group consisting of phosphite, polymeric phosphite, beta-diketone and epoxidized soybean oil.

10. An article of claim 1 wherein said article has a percent light transmission greater than that described by the formula:

% light transmission=100-400 (inch thickness).

11. An article of claim 10 wherein said article has a perent haze less than that described by the formula:

% haze=100 (inch thickness).

12. An article of claim 11 wherein said article is substantially free of tin stabilizer.

13. An article of claim 12 wherein said article is a bottle.

14. A bottle of claim 13 having a wall thickness of from about 0.005 inch to about 0.100 inch.

15. An article of claim 1 wherein said article is a film.

16. A film of claim 15 wherein said film has a thickness of from about 0.001 inch to about 0.100 inch.

17. a polyvinyl chloride composition comprising:
(A) 100 parts by weight of PVC;
(B) stabilizer system comprising (i) from about 0.005 part by weight to about 1.0 part by weight of at least one zinc soap, and (ii) from 0 to about 1.0 part by weight of at least one calcium soap;
(C) co-stabilizer system comprising from about 0.2 part by weight to about 1.5 parts by weight of at least one co-stabilizer compound selected from the group consisting of compounds having the formula:

OH—X—O—R and

R—O—X—O—R wherein X is a straight chain, branched or cyclic radical having:
(a) from 2 to about 20 oxygen atoms, wherein at least one of said oxygen atoms forms an ether linkage and the remainder forms bonds selected from the group consisting of ether, epoxy and hydroxy;
(b) from about 4 to about 60 carbon atoms; wherein R is a straight chain radical having from about 5 to about 40 carbon atoms;
(D) at least one lubricant;
(E) at least one impact modifier;
wherein said polyvinyl chloride composition is characterized by having the following properties:
(I) high degree of clarity as defined by having a percent light transmission greater than that described by the following formula:

% Light Transmission=100–460 (inch thickness) as measured according to ASTM D-1746;

(II) percent haze measured according to ASTM D-1003-61 and having a value less than that described by the following formula:

% Haze=184.6 (inch thickness);

(III) blush less than 30% at 0.065 inch thickness after exposure for 48 hours at 50° C. in a 50/50 ethanol water solution;
(IV) color stability time greater than 20 minutes to turn black when aged at 200° C., according to ASTM D-1925;
(V) said PVC composition does not impart an objectionable taste nor odor to other materials in contact with said PVC composition;

(VI) yellowness index less than about 13% at 0.065 inch thickness as measured according to ASTM D-1925 on an unpigmented compound.

18. A polyvinyl chloride composition of claim 17 wherein said co-stabilizer in (C) is selected from the group consisting of oligo-glycerol, oligo-propylene glycol and olig-ethylene glycol; wherein said oligo-glycerol has the formula:

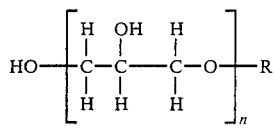

said glycerol may be straight chain, branched or cyclic; wherein n=2 to 20 and R is a straight chain radical having from about 5 to about 40 carbon atoms; said oligo-propylene glycol has the formula:

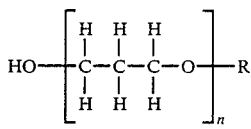

wherein n and R are as defined above; said oligio-ethylene glycol has the formula:

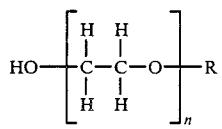

wherein n and R are as defined above.

19. A composition of claim 18 wherein said oligo-glycerol is an ester of oligo-glycerol and a fatty acid wherein the molar ratio of glycerol to fatty acid is greater than 1:1.

20. A composition of claim 19 wherein said molar ratio is greater than 2:1.

21. A composition of claim 20 wherein said ester of oligo-glycerol and a fatty acid is selected from the group consisting of triglycerol monosterate, hexaglycerol monostearate and hexaglycerol distearate.

22. A composition of claim 21 wherein the level of said ester is from about 0.4 part to about 1.5 parts by weight per 100 parts by weight of PVC.

23. A compostion of claim 22 wherein the polyvinyl chloride is a polyvinyl chloride homopolymer.

24. A composition of claim 23 wherein the levels of each of the zinc soap and calcium soap is from about 0.03 part by weight to about 0.3 part by weight per 100 parts by weight of PVC.

25. A composition of claim 24 wherein there is present at least two additional co-stabilizers selected from the group consisting of phosphite, polymeric phosphite, beta-diketone and epoxidized soybean oil.

26. A composition of claim 25 in the fused state.

27. A process for producing a clear polyvinyl chloride article comprising shaping a polyvinyl chloride composition having the following characteristics:
(a) high degree of clarity as defined by having a percent light transmission greater than that described by the following formula:

% Light Transmission=100−460 (inch thickness) as measured according to ASTM D-1746;
(b) percent haze measured according to ASTM D-1003-61 and having a value less than that described by the following formula:

% Haze=184.6 (inch thickness);

(c) blush less than 30% at 0.065 inch thickness after exposure for 48 hours at 50°0 C. in a 50/50 ethanol water solution;
(d) yellowness index less than about 13% at 0.065 inch thickness as measured according to ASTM D-1925 on an unpigmented compound.
(e) color stability according to ASTM D-1925 of a time greater than 20 minutes to turn black when aged at 200° C.;
(f) said compositions do not impart taste nor odor to materials in contact with said composition; said shaping is performed by molding, calendering, extruding, or pressing; wherein said polyvinyl chloride composition comprises:
(A) 100 parts by weight of PVC;
(B) stabilizer system comprising (i) from about 0.005 part by weight to about 1.0 part by weight of at least one zinc soap, and (ii) from 0 to about 1.0 part by weight of at least one calcium soap;
(C) co-stabilizer system comprising from about 0.2 part by weight to about 1.5 parts by weight of at least one co-stabilizer compound selected from the group consisting of compounds having the formula:

OH—X—O—R and

R—O—X—O—R wherein X is a straight chain, branched or cyclic radical having:
(I) from 2 to about 20 oxygen atoms, wherein at least one of said oxygen atoms forms an ether linkage and the remainder forms bonds selected from the group consisting of ether, epoxy and hydroxy;
(II) from about 4 to about 60 carbon atoms; wherein R is a straight chain radical having from about 5 to about 40 carbon atoms;
(D) at least one lubricant;
(E) at least one impact modifier; extruding, or pressing.

28. A process of claim 27 wherein said process is conducted at a temperature greater than 180° C.

* * * * *